(12) United States Patent
Long et al.

(10) Patent No.: US 10,665,896 B2
(45) Date of Patent: May 26, 2020

(54) POLYMER NETWORK SINGLE-ION CONDUCTORS WITH FLEXIBLE LINKER

(71) Applicant: The Regents of the University of California, Oakland, CA (US)

(72) Inventors: Jeffrey R. Long, Oakland, CA (US); Jeffrey F. Van Humbeck, Watertown, MA (US); Jordan C. Axelson, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 30 days.

(21) Appl. No.: 15/580,655

(22) PCT Filed: Jun. 10, 2016

(86) PCT No.: PCT/US2016/037036
§ 371 (c)(1),
(2) Date: Dec. 7, 2017

(87) PCT Pub. No.: WO2016/201335
PCT Pub. Date: Dec. 15, 2016

(65) Prior Publication Data
US 2018/0166744 A1     Jun. 14, 2018

Related U.S. Application Data

(60) Provisional application No. 62/173,743, filed on Jun. 10, 2015.

(51) Int. Cl.
*H01M 10/05* (2010.01)
*C08G 65/30* (2006.01)
(Continued)

(52) U.S. Cl.
CPC ......... *H01M 10/0565* (2013.01); *B01J 41/13* (2017.01); *C08G 65/00* (2013.01);
(Continued)

(58) Field of Classification Search
CPC ........... H01M 10/0565; H01M 10/052; H01M 2300/0082; C08G 83/00; C08G 65/00;
(Continued)

(56) References Cited

U.S. PATENT DOCUMENTS

2016/0315348 A1    10/2016 Long et al.

FOREIGN PATENT DOCUMENTS

| WO | 2013/099224 A1 | 7/2013 | |
| WO | WO-2013099224 A1 * | 7/2013 | .......... H01M 10/052 |
| WO | WO 2013099224 A1 * | 7/2013 | |

OTHER PUBLICATIONS

Zhang, Y. et al. "A class of sp3 boron-based single-ion polymeric electrolytes for lithium ion batteries", RSC Advances, 2013, vol. 3, pp. 14934-14937. (Year: 2013).*

(Continued)

*Primary Examiner* — Michael Bernshteyn
(74) *Attorney, Agent, or Firm* — Gavrilovich, Dodd & Lindsey LLP (57) ABSTRACT

The disclosure provides for polymer networks having the general structure:

(Continued)

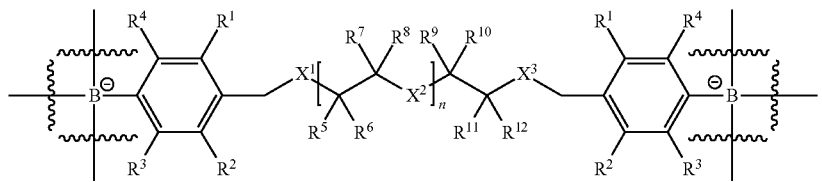

that can effecttively serve as a single-ion conducting electrolyte.

20 Claims, 6 Drawing Sheets (51) Int. Cl.
| C08G 75/14 | (2006.01) |
| C08G 65/00 | (2006.01) |
| C08G 83/00 | (2006.01) |
| C08L 71/00 | (2006.01) |
| C08G 81/00 | (2006.01) |
| C08G 79/08 | (2006.01) |
| C08L 85/04 | (2006.01) |
| B01J 41/13 | (2017.01) |
| H01M 10/0565 | (2010.01) |
| C08G 65/337 | (2006.01) |
| C08G 65/338 | (2006.01) |
| H01M 10/052 | (2010.01) |
| H01M 10/0525 | (2010.01) |

(52) U.S. Cl.
CPC ......... *C08G 65/337* (2013.01); *C08G 65/338* (2013.01); *C08G 75/14* (2013.01); *C08G 79/08* (2013.01); *C08G 81/00* (2013.01); *C08G 83/00* (2013.01); *C08L 71/00* (2013.01); *C08L 85/04* (2013.01); *H01M 10/052* (2013.01); *H01M 10/0525* (2013.01); *H01M 2300/0082* (2013.01)

(58) Field of Classification Search
CPC .... C08G 65/337; C08G 65/338; C08G 75/14; C08G 81/00; C08L 71/00; C08L 49/00; C08L 85/04; B01J 41/13
USPC .......................................................... 521/25
See application file for complete search history.

(56) References Cited

OTHER PUBLICATIONS

Liang, S. et al. "Synthesis and Lithium Ion Conduction of Polysiloxane Single-Ion Conductors Containing Novel Weak-Binding Borates", Chemistry of Materials, 2012, vol. 24, pp. 2316-2323. (Year: 2012).*
Uchimoto, Y. et al. "Lithium Ion Conduction in Solid Polymer Electrolyte Containing Borate Ester Groups", In: Extended Abstracts for the 201st Electrochemical Society Meeting, 2002, internal p. 1. (Year: 2002).*
Sun, X. et al. "Synthesis and Characterization of Network Single Ion Conductors Based on Comb-Branched Polyepoxide Ethers and Lithium Bis(allylmalonato) borate", Macromolecules, 2006, vol. 39, pp. 362-372. (Year: 2006).*
Zhang et al. "A class of sp3 boron-based single-ion polymeric electrolytes for lithium ion batteries",RSC Advances, 2013, vol. 3, pp. 14934-14937 (p. 14934, left column; Figure 1) (Year: 2013).*
Liang et al. "Synthesis and Lithium Ion Conduction of Polysiloxane Single-Ion Conductors Containing Novel Weak-Binding Borates", Chemistry of Materials, 2012, vol. 24, pp. 2316-2323 (abstract: Scheme 3) (Year: 2012).*
Uchimoto et al. "Lithium Ion Conduction in Solid Polymer Electrolyte Containing Borate Ester Groups", In: Extended Abstracts for the 201st Electrochemical Society Meeting, 2002, internal p. 1 (left column: Figure 1) (Year: 2002).*
Sun et al. "Synthesis and Characterization of Network Single Ion Conductors Based on Comb-Branched Polyepoxide Ethers and Lithium Bis(allylmalonato) borate", Macromolecules, 2006, vol. 39, pp. 362-372 (abstract; Scheme 2) (Year: 2006).*
Kim, Dong Seok, International Search Report and Written Opinion, PCT/US2016/037036, Korean Intellectual Property Office, dated Sep. 22, 2016.
Wittmann-Regis, Agnes, International Preliminary Report on Patentability and Written Opinion, PCT/US2016/037036, The International Bureau of WIPO, dated Dec. 21, 2017.
Liang et al., "Synthesis and Lithium Ion Conduction of Polysiloxoane Single-Ion Conductors Containing Novel Weak-Binding Borates," Chemistry of Materials, Vo.. 24, pp. 2316-2323, 2012.
Reiter, Jakub et al. "Ion-conducting lithium bis(oxalato)borate-based polymer electrolytes," Journal of Power Sources, vol. 189, pp. 133-138 (2009).
Sun et al., "Synthesis and Characterization of Network Single Ion Conductors Based on Comb-Branched Polyepoxide Ethers and Lithium Bis(allymalonato)borate," Macromolecules, vol. 39, pp. 362-372, 2006.
Uchimoto et al., "Lithium Ion Conduction in Solid Polymer Electrolyte Containing Borate Ester Groups," Extended Abstracts for the 201st Electrochemical Society Meeting, 2002.
Watanabe Masayoshi et al., "Single ion conduction in polyether electrolytes alloyed with lithium salt of a perfluorinated polyimide," Electrochimica Acta, vol. 45, pp. 1187-1192 (2000).
Zhang et al., "A class of sp3 boron-based single-ion polymeric electrolytes for lithium ion batteries," RSC Advances, vol. 3, pp. 14934-14937, 2013.
Zhang, Zhengcheng et., "Cross-linked network polymer electrolytes based on a polysiloxane backbone with oligo (oxyethylene) side chains: synthesis and conductivity," Macromolecules, vol. 36, pp. 9176-9180 (2003).
Zhang, Z. C. et al., "Ion conductive characteristics of cross-linked network polysiloxane-based solid polymer electrolytes" Solid State Ionics, vol. 170, pp. 233-238 (2004).

* cited by examiner

POLYMER NETWORK SINGLE-ION CONDUCTORS WITH FLEXIBLE LINKER

CROSS REFERENCE TO RELATED APPLICATIONS

This application is a U.S. National Stage Application filed under 35 U.S.C. § 371 and claims priority to International Application No. PCT/US2016/037036, filed Jun. 10, 2016, which application claims priority under 35 U.S.C. § 119 to Provisional Application Ser. No. 62/173,743, filed Jun. 10, 2015, the disclosures of which are incorporated herein by reference.

STATEMENT REGARDING FEDERAL SPONSORED RESEARCH

This invention was funded in part by Grant No. DGE1106400 awarded by the National Science Foundation. The U.S. Government has certain rights in the invention.

TECHNICAL FIELD

The disclosure provides for polymer networks that can effectively serve as a single-ion conducting electrolyte.

BACKGROUND

Lithium-ion batteries have become a ubiquitous technology for personal electronics and electric/hybrid vehicles. Commercially available lithium ion batteries rely on simple lithium salts dissolved in high dielectric organic solvent mixtures, usually based on carbonates and/or glymes. Next generation batteries, however, require improved electrolytes. An ideal electrolyte would allow for the free movement of lithium cations but have immobilized anions, and would prevent short circuiting due to lithium dendrite formation.

SUMMARY

Provided herein are novel and innovative polymer networks which comprise one or more substituted arylborate cores that conduct ions in an efficient manner. The three-dimensional connectivity of the polymer networks disclosed herein provides added strength and flexibility, and further prevents the penetration of the polymers by lithium dendrites. Moreover, network polymers substituted with fluorine atoms provide additional stability by decreasing the polymer network's reactivity and flammability. The polymer networks of the disclosure can be used in a variety of applications and devices, including batteries (e.g., lithium ion batteries), nuclear separations, and environmental remediation.

The disclosure provides a conductive three dimensional (3D) polymer network comprising one or more cores having a structure of Formula I:

(Formula I)

wherein, $R^1$-$R^{12}$ are independently selected from the group comprising H, D, optionally substituted FG, optionally substituted alkyl, optionally substituted heteroalkyl, optionally substituted alkenyl, optionally substituted heteroalkenyl, optionally substituted alkynyl, optionally substituted heteroalkynyl, optionally substituted cycloalkyl, optionally substituted cycloalkenyl, optionally substituted aryl, optionally substituted heterocycle, optionally substituted mixed ring system, wherein one or more adjacent R groups can be linked together to form one or more substituted rings selected from the group comprising cycloalkyl, cycloalkenyl, heterocycle, aryl, and mixed ring system; and n is 0 or more (e.g., 0, 1, 2, 3, 4, 5, 6, 7, 8, 10, 15, 20, 21 or more); $X^1$-$X^3$ are each independently O, C, N or S. In one embodiment, $X^1$-$X^3$ are each O. In another embodiment, $X^1$ and $X^3$ are each O, S or N and $X^2$ is selected from O, S, N or C. In yet another embodiment, $X^1$ and $X^3$ are O and $X^2$ is C. In another embodiment, $X^1$ and $X^3$ are S and $X^2$ is C. In another embodiment, $X^1$ and $X^3$ are N and $X^2$ is C or O. In one embodiment, the 3D polymer network comprises a mixture of linkers of different lengths, wherein n comprises a plurality of different integer (e.g., n is 2 and 8).

The disclosure also provides a conductive three dimensional (3D) polymer network comprising one or more cores having a structure of Formula I(a):

Formula I(a)

wherein, $R^5$-$R^{12}$ are independently selected from the group comprising H, D, optionally substituted FG, optionally substituted alkyl, optionally substituted heteroalkyl, optionally substituted alkenyl, optionally substituted heteroalkenyl, optionally substituted alkynyl, optionally substituted heteroalkynyl, optionally substituted cycloalkyl, optionally substituted cycloalkenyl, optionally substituted aryl, optionally substituted heterocycle, optionally substituted mixed ring system, wherein one or more adjacent R groups can be linked together to form one or more optionally substituted rings selected from the group comprising cycloalkyl, cycloalkenyl, heterocycle, aryl, and mixed ring system; wherein n is 0 or more (e.g., 0, 1, 2, 3, 4, 5, 6, 7, 8, 10, 15, 20, 21 or more); $X^1$-$X^3$ are each independently O, C, N or S. In one embodiment, $X^1$-$X^3$ are each O. In another embodiment, $X^1$ and $X^3$ are each O, S or N and $X^2$ is selected from O, S, N or C. In yet another embodiment, $X^1$ and $X^3$ are O and $X^2$ is C. In another embodiment, $X^1$ and $X^3$ are S and $X^2$ is C. In another embodiment, $X^1$ and $X^3$ are N and $X^2$ is C or O. In one embodiment, the 3D polymer network comprises a mixtures of linkers of different lengths, wherein n comprises a plurality of different integer (e.g., n is 0 and 21 or more). In one embodiment, $R^5$-$R^{12}$ are independently selected from H, D, F, hydroxyl, amino, and alkoxy. In another embodiment, $R^5$-$R^{12}$ are H.

The disclosure also provides a conductive three dimensional (3D) polymer network comprising one or more cores having a structure of Formula I(b):

embodiment, $R^5$-$R^{12}$ are independently selected from H, D, F, hydroxyl, amino, and alkoxy. In another embodiment, $R^5$-$R^{12}$ are H. In yet another embodiment of any of the foregoing, the polymer network has a diamondoid topology. In yet another embodiment of any of the foregoing the topology is tangled, erratic and/or amorphous. In yet a further embodiment of any of the foregoing, the polymer network has dense interpenetration of a plurality of individual polymer networks. In still a further embodiment of any of the foregoing, the polymer network is non-porous. In a further embodiment of any of the foregoing, the polymer network was polymerized by using 1,4-dioxane. In still further embodiments of any of the foregoing, the polymer network is charged with lithium ions using a lithium containing base (e.g., n-butyllithium). In yet a further embodiment, the polymer network was processed by immersing the polymer network in one or more of the following solvent mixtures: deionized water, methanol, 1:1 methanol:tetrahydrofuran, tetrahydrofuran, and dichloromethane. In another embodiment of any of the foregoing, the polymer network was dried by heating at about 100-120° C. in vacuo (<0.1 torr) for at least 12 h. In yet another embodiment of the foregoing, the 3D polymer network is loaded with a propylene carbonate solvent. In another embodiment, the 3D polymer network is loaded with a plasticizer (e.g., propylene carbonate, dimethyl carbonate, ethylene carbonate, or short chain poly(ethylene glycols)). In still another embodiment of any of the foregoing, the 3D polymer network conducts Formula I(b)

wherein, $R^5$-$R^{12}$ are independently selected from the group comprising H, D, optionally substituted FG, optionally substituted alkyl, optionally substituted heteroalkyl, optionally substituted alkenyl, optionally substituted heteroalkenyl, optionally substituted alkynyl, optionally substituted heteroalkynyl, optionally substituted cycloalkyl, optionally substituted cycloalkenyl, optionally substituted aryl, optionally substituted heterocycle, optionally substituted mixed ring system, wherein one or more adjacent R groups can be linked together to form one or more optionally substituted rings selected from the group comprising cycloalkyl, cycloalkenyl, heterocycle, aryl, and mixed ring system; wherein n is 0 or more (e.g., 0, 1, 2, 3, 4, 5, 6, 7, 8 or more). In one embodiment, the 3D polymer network comprises a mixtures of linkers of different lengths, wherein n comprises a plurality of different integer (e.g., n is 2 and 8). In one lithium ions. In one embodiment, the solvent-free 3D polymer network has lithium ion conductivity of at least $1.8 \times 10^{-6}$ S/cm at 100° C. temperature. In another embodiment in which the material has been loaded with plasticizer (e.g., triglyme and/or propylene carbonate), the 3D polymer network has lithium ion conductivity of at least $3.3 \times 10^{-4}$ S/cm at ambient (26° C.) temperature. In another embodiment of any of the foregoing, the 3D polymer network cannot be penetrated by lithium dendrites.

The disclosure also provides a battery comprising the conductive 3D polymer network of any of the foregoing embodiments. In one embodiment, the battery is a lithium ion battery.

The details of one or more embodiments of the disclosure are set forth in the accompanying drawings and the description below. Other features, objects, and advantages will be apparent from the description and drawings, and from the claims.

DESCRIPTION OF DRAWINGS

FIG. 1A-D shows components of network polymers. (A) The diamondoid connectivity of a neutral framework (left) and the corresponding anionic framework (right) generated by replacing tetrahedral carbon with borate. (B) A neutral carbon node (left) and the proposed anionic, fluorinated tetraaryl borate node (right). (C) The rigid linker used in the 1st generation rigid materials (see, PCT Application No. PCT/US2014/069017, the disclosure of which is incorporated herein by reference). (D) The flexible poly(ethylene glycol) (PEG) linker, in which n≥0, and (E) the flexible alkanediol linker, in which n≥0, used in the 2nd generation polymeric materials as described herein.

FIG. 2A-C shows impedance spectra for the borate-PEG (n=21) polymer. (A) The dry polymer at ambient temperature is not conductive. (B) The dry polymer becomes conductive at elevated temperature ($1.8 \times 10^{-6}$ S cm' @ 100° C.). (C) The addition of solvent (57 wt % propylene carbonate) enhances conductivity at ambient temperature ($1.4 \times 10^{-5}$ S cm' @ 30° C.).

FIG. 3A-D shows structural details of the invention. (A) The tetrahedral perfluoroarylborate node. (B) The flexible poly(ethylene glycol) (PEG) linker, in which n≥0. (C) The three-dimensional connectivity of the borate node and flexible linker. (D) The three-dimensional extended connectivity of the material.

DETAILED DESCRIPTION

As used herein and in the appended claims, the singular forms "a," "and," and "the" include plural referents unless the context clearly dictates otherwise. Thus, for example, reference to "a linking moiety" includes a plurality of such linking moieties and reference to "the lithium-ion battery" includes reference to one or more lithium-ion batteries and equivalents thereof known to those skilled in the art, and so forth.

Unless defined otherwise, all technical and scientific terms used herein have the same meaning as commonly understood to one of ordinary skill in the art to which this disclosure belongs. Although any methods and reagents similar or equivalent to those described herein can be used in the disclosed methods and compositions, the exemplary methods and materials are now described.

Also, the use of "or" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

All publications mentioned herein are incorporated herein by reference in full for the purpose of describing and disclosing the methodologies, which are described in the publications, which might be used in connection with the description herein. However, with respect to any similar or identical terms found in both the incorporated publications or references and those expressly put forth or defined in this application, then those terms definitions or meanings expressly put forth in this application shall control in all respects.

As used herein, a "core" refers to a repeating unit or units found in a polymer network. A polymer network can comprise a homogenous repeating core, a heterogeneous repeating core or a combination of homogenous and heterogeneous cores. A core comprises one or more boron anions and one or more linking moieties. Various cores are depicted as structures throughout the disclosure as Formulas. Counter ions, such as lithium ions, have been omitted for clarity, but it should be understood that cores include associated counter ions. Therefore, a person of skill in the art should assume that the boron anions are capable of associating with counter ions, or have associated with the counter ions, even though they are not visually depicted as such in the Formulas.

The term "functional group" or "FG" refers to specific groups of atoms within molecules that are responsible for the characteristic chemical reactions of those molecules. While the same functional group will undergo the same or similar chemical reaction(s) regardless of the size of the molecule it is a part of, its relative reactivity can be modified by nearby functional groups. The atoms of functional groups are linked to each other and to the rest of the molecule by covalent bonds. Examples of FGs that can be used in this disclosure, include, but are not limited to, substituted or unsubstituted alkyls, substituted or unsubstituted alkenyls, substituted or unsubstituted alkynyls, substituted or unsubstituted aryls, substituted or unsubstituted hetero-alkyls, substituted or unsubstituted hetero-alkenyls, substituted or unsubstituted hetero-alkynyls, substituted or unsubstituted cycloalkyls, substituted or unsubstituted cycloalkenyls, substituted or unsubstituted hetero-aryls, substituted or unsubstituted heterocycles, halos, hydroxyls, anhydrides, carbonyls, carboxyls, carbonates, carboxylates, aldehydes, haloformyls, esters, hydroperoxy, peroxy, ethers, orthoesters, carboxamides, amines, imines, imides, azides, azos, cyanates, isocyanates, nitrates, nitriles, isonitriles, nitrosos, nitros, nitrosooxy, pyridyls, sulfhydryls, sulfides, disulfides, sulfinyls, sulfos, thiocyanates, isothiocyanates, carbonothioyls, phosphinos, phosphonos, phosphates, $Si(OH)_3$, $Ge(OH)_3$, $Sn(OH)_3$, $Si(SH)_4$, $Ge(SH)_4$, $AsO_3H$, $AsO_4H$, $P(SH)_3$, $As(SH)_3$, $SO_3H$, $Si(OH)_3$, $Ge(OH)_3$, $Sn(OH)_3$, $Si(SH)_4$, $Ge(SH)_4$, $Sn(SH)_4$, $AsO_3H$, $AsO_4H$, $P(SH)_3$, and $As(SH)_3$.

The term "hetero-" when used as a prefix, such as, heteroalkyl, hetero-alkenyl, hetero-alkynyl, or hetero-hydrocarbon, for the purpose of this disclosure refers to the specified hydrocarbon having one or more carbon atoms replaced by non-carbon atoms as part of the parent chain. Examples of such non-carbon atoms include, but are not limited to, N, O, S, Si, Al, B, and P. If there is more than one non-carbon atom in the hetero-based parent chain then this atom may be the same element or may be a combination of different elements, such as N and O.

The term "mixed ring system" refers to optionally substituted ring structures that contain at least two rings, and wherein the rings are joined together by linking, fusing, or a combination thereof. A mixed ring system comprises a combination of different ring types, including cycloalkyl, cycloalkenyl, aryl, and heterocycle.

As the most reducing and lightest metal, lithium is a desirable anode material to incorporate into batteries due to its abilities to yield a high cell voltage and a high specific energy capacity, particularly valuable characteristics in applications such as electric or hybrid vehicles and the storage of unpredictable renewable energy sources like wind and solar. Consequently, nearly all high-capacity batteries, from laptops to electric vehicles, are based on Li-ion technology. In such batteries, the carbon-based anode is separated from the transition metal oxide-based cathode by a porous plastic film soaked in an electrolyte solution composed of a lithium salt dissolved in an organic carbonate.

Even though Li-ion batteries are today's standard when high gravimetric capacity is required, the technology is far from flawless or even fail-safe. For example, the organic solvents used to dissolve the lithium salts are flammable, volatile, and corrosive. In the event of an internal short circuit, such as in the event of an electric vehicle collision or due to penetration by dendrites over the course of many charge-discharge cycles, these solvents are particularly hazardous as they are a primary source of combustible fuel. In order to mitigate the inherent dangers posed by organic solvents and the formation of dendrites, extra weight is added during the engineering stage of the battery pack in the forms of extensive mechanical protection of the individual electrochemical cells to avoid intrusion and deformation and as thermal and electric control and management systems to monitor for thermal runaway. These measures are needed because the total combustible energy in such systems can be an order of magnitude greater than the stored electrochemical energy. Although these safeguards are necessary for the current technology, they increase the weight of the battery pack-in turn decreasing its specific energy capacity- and inflate the cost of production. These consequences are particularly detrimental to the emerging arena of electric vehicles, as the greatest barrier to affordability for the masses is the initial purchase cost. Thus, increasing the usable capacity of these electrochemical cells and decreasing their cost while maintaining safety is imperative to facilitating the transition from gasoline based transportation to that of an electric powered fleet. One way to tackle this issue is to remove the need for solvent altogether by developing solid electrolyte materials that are conductive toward lithium ions and mechanically robust, such that they suppress dendrite formation and/or are resistant toward penetration. Such an electrolyte would decrease the cost of battery packs on two fronts; its implementation would result in a significant weight reduction as well as largely eliminate the need for expensive monitoring and control systems.

Another problem that arises with liquid electrolytes is that both the cation and the counter anion contribute to the observed conductivity. The unrestricted movement of the anions reduces cell lifetimes and cycling performance by generating concentration gradients and cell polarization and causes anions to accumulate at the electrode surface, which in turn can facilitate dendrite formation. The gathering of anions at the surface results in unwanted decomposition of the anions, which in turn interferes with the formation of the electrode-electrolyte interface and has been shown to detrimentally affect battery performance.

Lithium-ion batteries have become a ubiquitous technology for personal electronics and electric/hybrid vehicles. Numerous research efforts are being directed at improving each of the three main components of the battery system: the anode, the cathode, and the electrolyte. Currently, commercially available lithium ion batteries rely on simple non-coordinating lithium salts ($LiBF_4$ and $LiPF_6$) dissolved in high dielectric organic solvent mixtures, usually based on carbonates (e.g., propylene carbonate, dimethyl carbonate, etc.) and/or glymes (e.g., diglyme, triglyme, etc.). Although such technology has been successfully commercialized, next-generation battery targets, such as those involving pure lithium metal anodes, or lithium air batteries, will require improved electrolytes.

Current electrolytes have three main features limiting their future application in advanced batteries. First, the use of a dissolved lithium salt (e.g., $LiPF_6$) results in a solution in which both cations and anions are free to move through the electrolyte. During operation, anions aggregate at the anode, creating a concentration polarization that negatively affects performance. Additionally, simple anions such as $PF_6^-$ will slowly decompose at the anode, forming inorganic products such as LiF and $Li_3P$. An ideal electrolyte would allow for lithium cations to move freely, but would have immobile anions; such materials are typically referred to as 'single-ion conductors'.

The use of electrolyte solutions presents a number of safety and performance concerns. The inherent flammability of the organic solvent, coupled with its lack of mechanical resistance, makes device short circuits possible, either due to lithium dendrite growth during repeated charge/discharge cycles, or due to physical trauma.

One of the main technical challenges in producing lithium batteries that feature pure lithium metal anodes is the formation of lithium dendrites during battery charge/discharge cycles. These dendrites are small filamentous projections of lithium metal that grow off of the anode during cycling. If these dendrites cross the electrolyte, and make contact with the cathode, a short circuit results. The immediate flow of electrons from the anode to cathode is accompanied by a tremendous release of heat, and a fire often results. An ideal electrolyte would be mechanically resistant, and prevent the growth of dendrites across the battery. A simple lithium salt solution, as is currently used, does not have the ability to prevent dendrite growth.

A clear benefit is obtained by reducing the amount of organic solvent in lithium batteries. Often, the initial stages of a battery failure are accompanied by the release of heat, which is sufficient to ignite the flammable organic solvent found in the electrolyte. If such ignition sources could be removed, the safety profile of these technologies would be significantly improved.

Numerous avenues of investigation are being pursued to address these limitations, with the goal of eventual incorporation in lithium metal cells. Anchoring of the counter-anions into a polymeric structure, which renders them immobile, yields what is termed a 'single-ion' conducting electrolyte. Ideally, such a polymer structure would also provide mechanical resistance to lithium dendrites and physical compaction, helping to prevent short-circuiting and the battery fires that would follow immediately after.

The innovative single-ion polymer network conductors disclosed herein have many advantages over other ion conducting materials. First, embedding borate anions in the polymer network renders only the lithium ions mobile.

Therefore, the polymer networks conduct only lithium ions. Second, the three-dimensional connectivity of the polymer network affords significant mechanical strength in comparison to linear polymers. Third, at elevated temperatures these polymers do not require the addition of solvent to exhibit conductivity, and at ambient temperature, although some amount of organic solvent is required, it is used in much smaller amounts than commonly used for commercial batteries.

Figure 1:
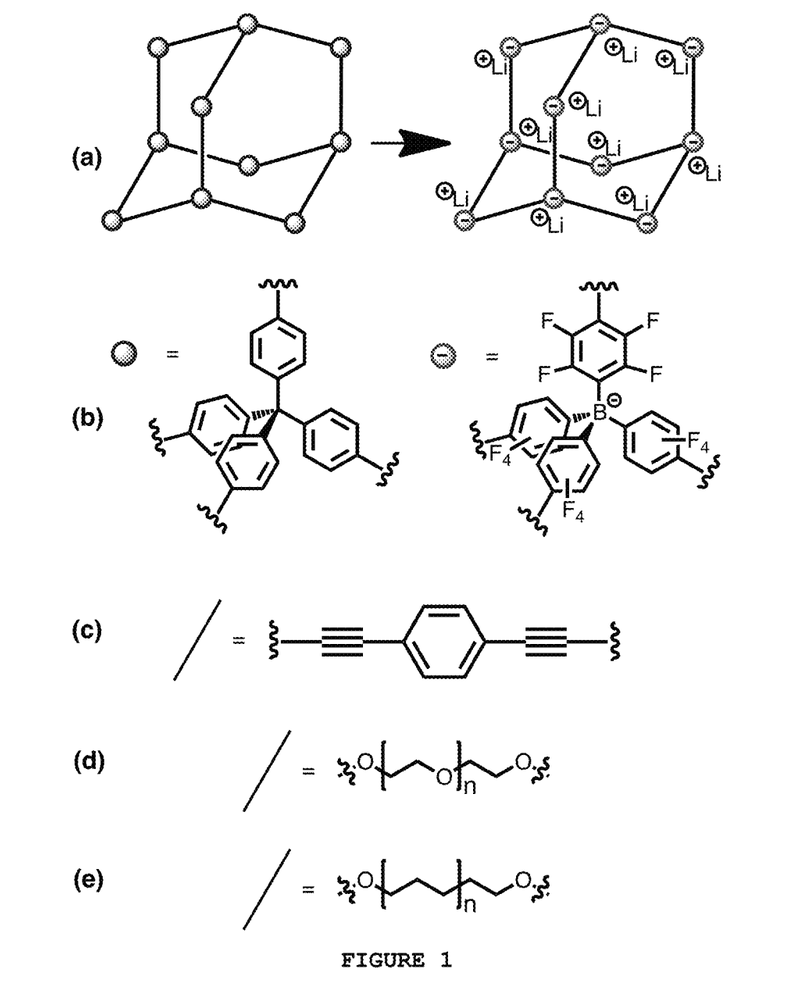

In order to address the shortcomings of commercial liquid electrolytes, the disclosure describes a robust, solvent-free, single-ion conducting electrolyte material as well as its plasticized counterpart. Framework-inspired network polymers are promising materials for this application. Network polymers are similar to porous organic frameworks in their modular design, as they form systematic, three-dimensional, covalently linked networks. While most reported to date are formed with tetrahedral carbon or adamantine nodes, and are thus charge neutral, the disclosure shows that substituting the commonly used carbon-based nodes with tetrahedral tetraphenylborate species introduces a negative charge (FIG. 1A). Because aryl units effectively delocalize the negative charge on the boron, in turn facilitating the dissociation of the corresponding lithium cation and promoting facile ion transport through the network, these anions are ideal components for single-ion conductors. Furthermore, the remarkable stability of network polymer materials makes them ideal candidates for high energy density batteries.

Previous work developed a system based on the borate node and rigid linker shown in FIG. 1B-C. The modular nature of the borate node and linker monomers allows for systematic synthetic tailoring of both components, which in turn allows for a great amount of control over and tunability in the properties of the resulting bulk material. For example, AC impedance measurements on pressed pellets demonstrated that the polymer made with borate nodes possessing fluorinated aryl rings and a linker of FIG. 1C exhibited conductivity of $2.5 \times 10^{-4}$ S cm$^{-1}$ at ambient temperature, an order of magnitude higher than an analogue in which the aryl units contained only hydrogen functionality. The transference number for the fluorinated material (t+=0.93) supports the position that this system does in fact serve as a single-ion conductor. Together, these results move this network polymer into the ring of viable materials that could be incorporated into a device. It should be noted that conductivity is only observed after the material is exposed to solvent; however, the amount required is significantly less than that used in a liquid electrolyte, and thus this material is a significant step toward eliminating the flammability hazards associated with the organic solvents required by liquid electrolytes. While the conductive properties of this material make it quite promising, the rigidity of the linker makes it brittle and prevents it from being easily processable. The present disclosure addresses this problem.

In addition to the various network polymers described herein, single-ion, solid polymer electrolytes are being explored as promising replacements for liquid electrolytes. Although the study of solid polymer electrolytes is a wide and active field of research, very little has been done to incorporate tetraaryl borate anions into these types of materials. Because fluorination has been shown to increase the thermal and chemical stability of a material, the fluorinated tetraaryl borate node was maintained, but the linker exchanged for flexible poly(ethylene glycol) (PEG) and alkanediol chains, examples of which are shown in FIG. 1D and FIG. 1E. PEG is well established in its ability to solvate lithium ions. Incorporating it as a linker will enable this second generation material to conduct ions without the need for any organic solvents whatsoever. Despite the flexibility inherent to PEG, the system of the disclosure has the unique ability to connect four distinct chains through a single borate. This high degree of cross-linking provides mechanical strength to the material, which should render it resistant to penetration by dendrites. Additionally, the cross-linking locks the anion into the polymer itself and prevents it from moving through the electrolyte, thus rendering only lithium cations mobile and preventing the unwanted effects associated with free, mobile anions. This new system can also be tailored such that it will be more processable than the material made with the rigid linker. Some degree of solubility will allow the second-generation material to be cast as a film onto an electrode surface. Alternatively, these materials could be cast into a mold to generate a free-standing film, as the borate and PEG monomers have been designed to possess reactive end groups, unlike the material made with the rigid linker, which required a precious metal catalyst.

Figure 2A:
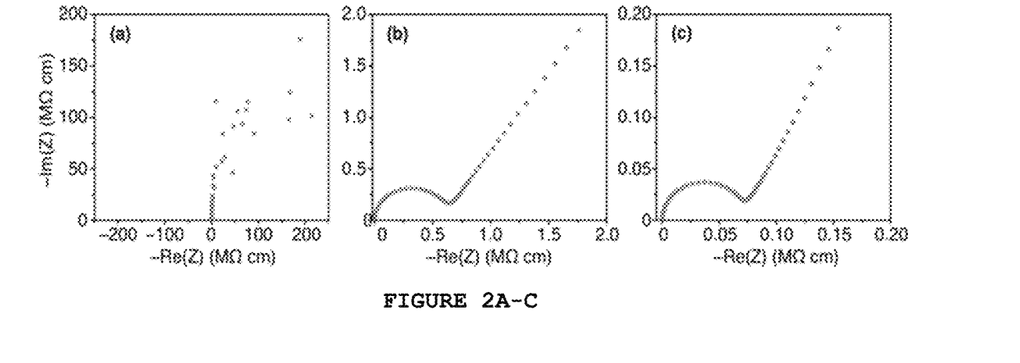

This system is quite versatile due to the variety of avenues it provides for tailoring and optimization of its properties. For example, one variable is how the linker length changes the properties of the polymers. Although the diamondoid connectivity shown in FIGS. 3C and 3D implies an open and ordered arrangement, this structure is likely highly interpenetrated and amorphous due to the inherently flexible nature of the linker chains. The length of the linker will dictate the ability of the linker to rearrange, altering the materials' mechanical and lithium transport properties. Preliminary studies have shown that this factor has an effect on the bulk mechanical and conductive characteristics of the polymers. Material incorporating short linkers (e.g., n=0, 1, 2) requires the addition of an organic solvent to be conductive ($3.3 \times 10^{-6}$ S/cm at ambient temperature with propylene carbonate), whereas dry material with longer linkers (e.g., n=8 to 22) is conductive at elevated temperatures ($1.8 \times 10^{-6}$ S/cm at 100° C.) as shown in FIG. 2A-B. Changing the length of the PEG linker also changes the mechanical properties of the bulk polymer; material made with short linkers (e.g., n=0, 1, 2) is a brittle powder whereas material made with longer linkers (e.g., n=8 to 21) is flexible and/or springy.

PEO was chosen as the linker in initial studies due to its intensively researched ability to solvate lithium ions. As a result of this property, it was believed that these polymers might not require the addition of solvent to exhibit conductivity. Although the material with short linkers (e.g., n=0, 1, 2) requires organic solvent to be conductive ($2.7 \times 10^{-6}$ S/cm at ambient temperature with propylene carbonate), dry materials with longer linkers (e.g., n=8 to 21) are conductive at elevated temperatures ($1.8 \times 10^{-6}$ S cm' at 100° C.). Additional tests have shown that conductivity can be enhanced further in materials that require plasticizer by utilizing non-coordinating linkers (e.g., terminally functionalized alkane chains), which increases conductivity to $3.3 \times 10^{-6}$ S/cm at ambient temperature with propylene carbonate.

The borate monomer is currently synthesized in a two-step process starting from 2,3,5,6-tetrafluorobenzyl alcohol. The alcohol is subjected to thionyl chloride at room temperature to produce 2,3,5,6-tetrafluorobenzyl chloride. This product is then deprotonated with n-butyllithium and exposed to boron trichloride to generate the lithium salt of the borate monomer. The polymerization is performed in a two-step, one-pot synthesis. After deprotonating the linker, the solution is exposed to the borate monomer and the polymer begins to form as the temperature of the reaction is increased to 100° C.

The disclosure provides single-ion conducting network polymers that are capable of conducting lithium ions in an efficient and safe manner. These polymer networks are three dimensional ("3D"), can be interpenetrating, and are comprised of substituted aryl borate building blocks linked together with flexible organic linkers. The polymer networks are synthesized by coupling the substituted aryl borate monomers with terminally functionalized linkers using common organic polymerization techniques (e.g., by nucleophilic substitution).

In a particular embodiment, a polymer network of the disclosure comprises one or more cores having the structure of Formula I:

(Formula I)

wherein, $R^1$-$R^{12}$ are independently selected from the group comprising H, D, optionally substituted FG, optionally substituted alkyl, optionally substituted heteroalkyl, optionally substituted alkenyl, optionally substituted heteroalkenyl, optionally substituted alkynyl, optionally substituted heteroalkynyl, optionally substituted cycloalkyl, optionally substituted cycloalkenyl, optionally substituted aryl, optionally substituted heterocycle, optionally substituted mixed ring system, wherein one or more adjacent R groups can be linked together to form one or more substituted rings selected from the group comprising cycloalkyl, cycloalkenyl, heterocycle, aryl, and mixed ring system; and n is 0 or more (e.g., 0, 1, 2, 3, 4, 5, 6, 7, 8, 10, 15, 20, 21 or more); $X^1$-$X^3$ are each independently O, C, N or S. In one embodiment, $X^1$-$X^3$ are each O. In another embodiment, $X^1$ and $X^3$ are each O, S or N and $X^2$ is selected from O, S, N or C. In yet another embodiment, $X^1$ and $X^3$ are O and $X^2$ is C. In another embodiment, $X^1$ and $X^3$ are S and $X^2$ is C. In another embodiment, $X^1$ and $X^3$ are N and $X^2$ is C or O. In one embodiment, the integer, n, provides a linker having a size of 380-420 amu. In another embodiment, the framework comprises a core having different "n" values (e.g., a combination of n=2 and n=8 etc.).

In another embodiment, a polymer network of the disclosure comprises a formula I, wherein each of $R^1$-$R^4$ is fluorine. For example, the polymer network can comprise one or more cores having the structure of Formula I(a):

Formula I(a)

wherein, $R^5$-$R^{12}$ are independently selected from the group comprising H, D, optionally substituted FG, optionally substituted alkyl, optionally substituted heteroalkyl, optionally substituted alkenyl, optionally substituted heteroalkenyl, optionally substituted alkynyl, optionally substituted heteroalkynyl, optionally substituted cycloalkyl, optionally substituted cycloalkenyl, optionally substituted aryl, optionally substituted heterocycle, optionally substituted mixed ring system, wherein one or more adjacent R groups can be linked together to form one or more optionally substituted rings selected from the group comprising cycloalkyl, cycloalkenyl, heterocycle, aryl, and mixed ring system; wherein n is 0 or more (e.g., 0, 1, 2, 3, 4, 5, 6, 7, 8, 10, 15, 20, 21 or more); $X^1$-$X^3$ are each independently O, C, N or S. In one embodiment, $X^1$-$X^3$ are each O. In another embodiment, $X^1$ and $X^3$ are each O, S or N and $X^2$ is selected from O, S, N or C. In yet another embodiment, $X^1$ and $X^3$ are O and $X^2$ is C. In another embodiment, $X^1$ and $X^3$ are S and $X^2$ is C. In another embodiment, $X^1$ and $X^3$ are N and $X^2$ is C or O. In one embodiment, the integer, n, provides a linker having a size of 380-420 amu. In another embodiment, the framework comprises core having different "n" values (e.g., a combination of n=2 and n=8 etc.).

In yet a further embodiment, a polymer network of the disclosure comprises one or more cores having the structure of Formula I(a):

Formula I(a)

wherein, $R^5$-$R^8$ are independently selected from H, D, F, hydroxyl, amino, and alkoxy and n is an integer between 7 and 23 and X is O.

In a certain embodiment, a polymer network of disclosure comprises one or more cores having the structure of:

wherein n is 0, 1, 2, 3, 4, 5, 6, 7, 8, 9, 10, 11, 12, 13, 14, 15, 16, 17, 18, 19, 20, 21, or 22 and $R^5$-$R^{12}$ are H or D.

Figure 3A:
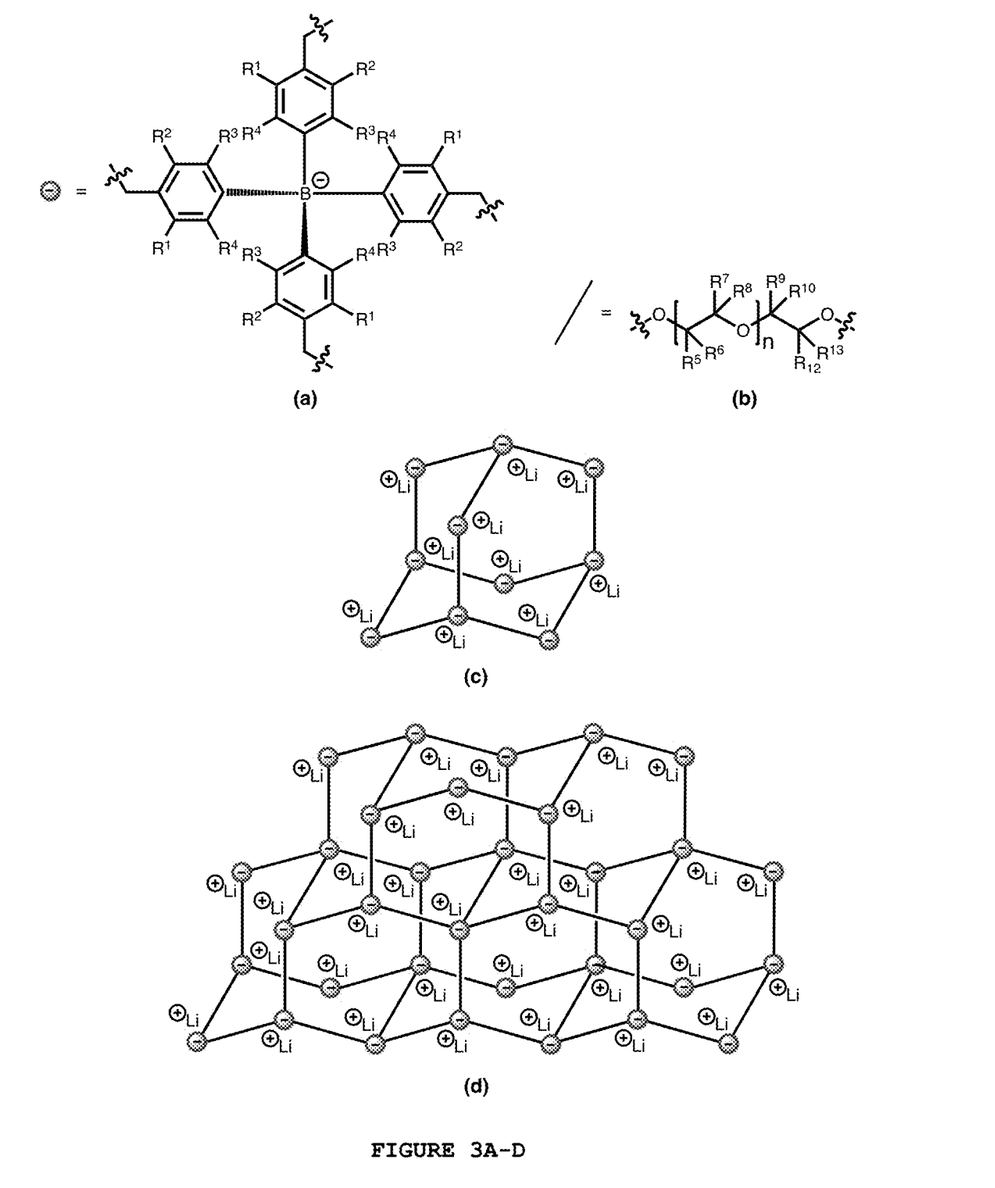

In a particular embodiment, the polymer networks disclosed herein have a diamondoid connectivity (e.g., see FIG. 3D). This topology allows for dense interpenetration of individual networks. Unlike other materials, such as microporous polymer networks utilizing 1,3,5 tri-substituted benzene linking moieties, the polymer networks disclosed herein can be porous or nonporous and flexible. In certain embodiment, the polymer networks are non-porous and flexible. One of the advantages of the polymer network being non-porous is that distance between nearest boron neighbor atoms is small which allows for efficient transferring of lithium ions between sites. By contrast, materials which are porous such as covalent organic frameworks (COFs) have significant gaps between anionic sites, which impede the efficient conduction of lithium ions.

The conductivity for the polymer networks disclosed herein is influenced by the polymerization and processing conditions. Accordingly, the conductivity properties of the networks can be tuned to meet specific requirements for particular applications by, e.g., modifying the linker size and composition. This difference in conductivity is likely due to folding and flexibility of the linker. For example, the lithium ions can move easily between these particles, as distance can be modulated by the flexibility of the linker.

In a particular embodiment, the conductive 3D polymer networks disclosed herein can be used in a variety of application where the selective transfer of single ions would be advantageous, such as for use in batteries, nuclear separations, or environmental remediation. In a certain embodiment, a lithium ion battery comprises a polymer network disclosed herein. Examples of lithium ion batteries that can be used with the polymer networks disclosed herein include, but are not limited to, 18650 (4/3AF), 18500, 14500(AA), 14430(4/5AA) 10440(AAA), 14650 (7/5AA), 17500(A), 26650 (Long C), 26650M, 38120P(M), 40160S(Long M), RCR123A, CR123A-Dummy, 1-2 C rate, High Power, 2032 button cell, and 2450 button cell.

The following examples are intended to illustrate but not limit the disclosure. While they are typical of those that might be used, other procedures known to those skilled in the art may alternatively be used.

EXAMPLES

All syntheses were performed using standard Schlenk techniques unless stated otherwise. Anhydrous diethyl ether and tetrahydrofuran were dried using a commercial solvent purification system designed by JC Meyer Solvent Systems. Anhydrous 1,4-dioxane purchased from Sigma-Aldrich was stored over molecular sieves for at least one day before use. Anhydrous methanol was purchased from EMD Chemicals Inc. and used as received. All other solvents and reagents were obtained from commercial vendors and utilized without further purification.

$^1$H and $^{19}$F NMR spectra were collected on a Bruker AVQ-400 MHz instrument and analyzed with MestReNova software (v8.0.2-11021, Mestrelab Research S.L.). All resonances are referenced to the residual solvent signals of CDCl$_3$ ($^1$H, 7.26 ppm), MeCN-d$_3$ ($^1$H, 1.94 ppm), and CFCl$_3$ ($^{19}$F, 0 ppm). CHN elemental analyses were performed at the Microanalytical Laboratory of the University of California, Berkeley.

Synthesis of 2,3,5,6-tetrafluorobenzyl chloride

A 100 mL oven-dried Schlenk flask was charged with 2,3,5,6-tetrafluorobenzyl alcohol (13.0 g, 72.1 mmol) and tetrabutylammonium chloride (10.0 g, 36.0 mmol). Thionyl chloride (30.0 mL, 411 mmol) was added slowly by syringe. After the bubbling had subsided, the flask was heated to 85° C. for 2 h and then allowed to cool to room temperature. The flask was transferred to a 0° C. ice bath, and the reaction was quenched with 40 mL of deionized water. Next, the solution was brought to pH 6 by the gradual addition of 40 mL of concentrated aqueous Na$_2$CO$_3$ followed by 28.8 g of solid Na$_2$CO$_3$. The solution was extracted with 4×40 mL of diethyl ether. The organic portions were combined, washed with 40 mL of brine, dried with MgSO$_4$, filtered, and concentrated on a rotary evaporator to give a yellow oil. Residual diethyl ether was removed under high vacuum. It should be noted that the product possesses a relatively low boiling point, and should only be kept under high vacuum until no more bubbling occurs. The pure product was obtained as a clear oil by vacuum distillation at ambient temperature (26° C.) and was collected in a bulb cooled by liquid N$_2$. In some instances, trace diethyl ether remained after distillation and was not removed prior to the subsequent step. Yield: 13.1 g (91.7%). $^1$H NMR (400 MHz, CDCl$_3$) δ 7.09 (tt, J=9.6, 7.4 Hz, 1H), 4.67 (t, J=1.4 Hz, 2H). $^{19}$F NMR (376 MHz, CDCl$_3$) δ −137.5 (ddd, J=22.1, 13.0, 9.1 Hz), −142.3 (ddd, J=21.3, 13.2, 7.2 Hz). Anal. Calcd. for C$_7$H$_3$ClF$_4$: C, 42.35; H, 1.52%. Found: C, 42.25; H, 1.44%.

Synthesis of di(1,2-dimethoxyethane)lithium tetrakis(4-(chloromethyl)-2,3,5,6-tetrafluorophenyl)borate A 200 mL oven-dried Schlenk flask was charged with 2,3,5,6-tetrafluorobenzyl chloride (2.00 g, 10.1 mmol) via syringe. Then, 250 mL of anhydrous diethyl ether were added via cannula. The solution was cooled to −78° C. for 10 minutes before 6.16 mL (9.86 mmol) of 1.6 M n-butyllithium in hexanes was added dropwise by syringe over the course of 5 min. The solution was left to stir at −78° C. for 1 h. Then, 2.24 mL (2.24 mmol) of 1.0 M BCl$_3$ in heptanes was added dropwise via syringe, causing a fog to form in the flask. The flask was kept at −78° C. for 2 h before being allowed to warm to room temperature overnight. In the morning, the cloudy solution was quenched with 30 mL of a 0.1 M aqueous LiCl solution. The organic layer was collected and washed with 2×30 mL of 0.1 M aqueous LiCl. The organic layer was dried with MgSO$_4$, filtered, and concentrated on a rotary evaporator to give a pale yellow oil. The oil was dissolved in 30 mL of toluene, and the solvent was removed under high vacuum. The viscous oil was dissolved in 10 mL of dichloromethane before another 20 mL of toluene was added. The solvent was again removed under high vacuum to give an off-white residue. The residue was transferred to a centrifuge tube and suspended in 30 mL of toluene with the aid of sonication. Centrifugation (5000 rpm, 10 min) was used to separate the mixture and the supernatant was decanted. Again, the solid was suspended in 30 mL of toluene and subjected to a second round of centrifugation. The supernatant was decanted and the white solid was dissolved in a minimal amount of 1,2-dimethoxyethane (approx. 5 mL). Hexanes (approx. 30 mL) were added to the solution until a layer of oil formed, and the solvent was removed under high vacuum. The residue was dissolved in 6 mL of dichloromethane followed by 30 mL of hexanes, and the solvent was again removed under vacuum to yield the final product as a white solid. Yield: 1.02 g (45.7%). $^1$H NMR (400 MHz, MeCN-d$_3$) δ 4.70 (s, 8H), 3.45 (s, 8H), 3.28 (s, 12H). $^{19}$F NMR (470 MHz, MeCN-d$_3$) δ −132.6, −148.6. ESI-MS (m/z): {C$_{28}$H$_8$BCl$_4$F$_{16}$}$^-$, 801. Anal. Calcd. for C$_{36}$H$_{28}$BCl$_4$F$_{16}$LiO$_4$: C, 43.76; H, 2.86%. Found: C, 43.59; H, 2.80%.

Synthesis of PEG-fluoroborate polymers

In a N$_2$-filled glovebag, 2 equivalents of linker were measured into a 20 mL vial, the vial threads were wrapped with Teflon tape, and the vial was sealed with a silicone septa screw cap. Then, 2 mL of anhydrous tetrahydrofuran were added via syringe, and 4 equivalents of 1.6 M n-butyllithium in hexanes were added slowly, dropwise via syringe with stirring. This solution was gently stirred at room temperature for 1 h before the solvent was removed under high vacuum and subsequently replaced by 1 mL of anhydrous 1,4-dioxane. Into a separate vial, 300 mg (1 equivalent, 304 mmol) of di(1,2-dimethoxyethane) lithium tetrakis(4-(chloromethyl)-2,3,5,6-tetrafluorophenyl)borate were weighed in air and were suspended with vigorous stirring in 1-2 mL of anhydrous 1,4-dioxane. After transferring the borate solution to the linker vial via syringe, an additional 0.5 mL of anhydrous 1,4-dioxane was used to rinse the borate vial and was also added to the linker vial. The reaction mixture was gently stirred for 1 min and then heated to 100° C. for 24 hours without stirring. After decanting the 1,4-dioxane, the polymer was subjected to a series of solvent washes. Solvent was exchanged by decanting after periods of at least 6 h: 3×6 mL dichloromethane at room temperature; 3×6 mL of anhydrous methanol at 55° C.; and finally 3×6 mL of anhydrous tetrahydrofuran at 55° C. After the last solvent wash was removed, the product was dried at room temperature for at least 6 hours under reduced pressure, and then dried at 120° C. under reduced pressure for at least 12 hours.

Polymer materials were synthesized using a plurality of linkers. For example, the linkers can be selected from the group consisting of:

-continued

Figure 4:
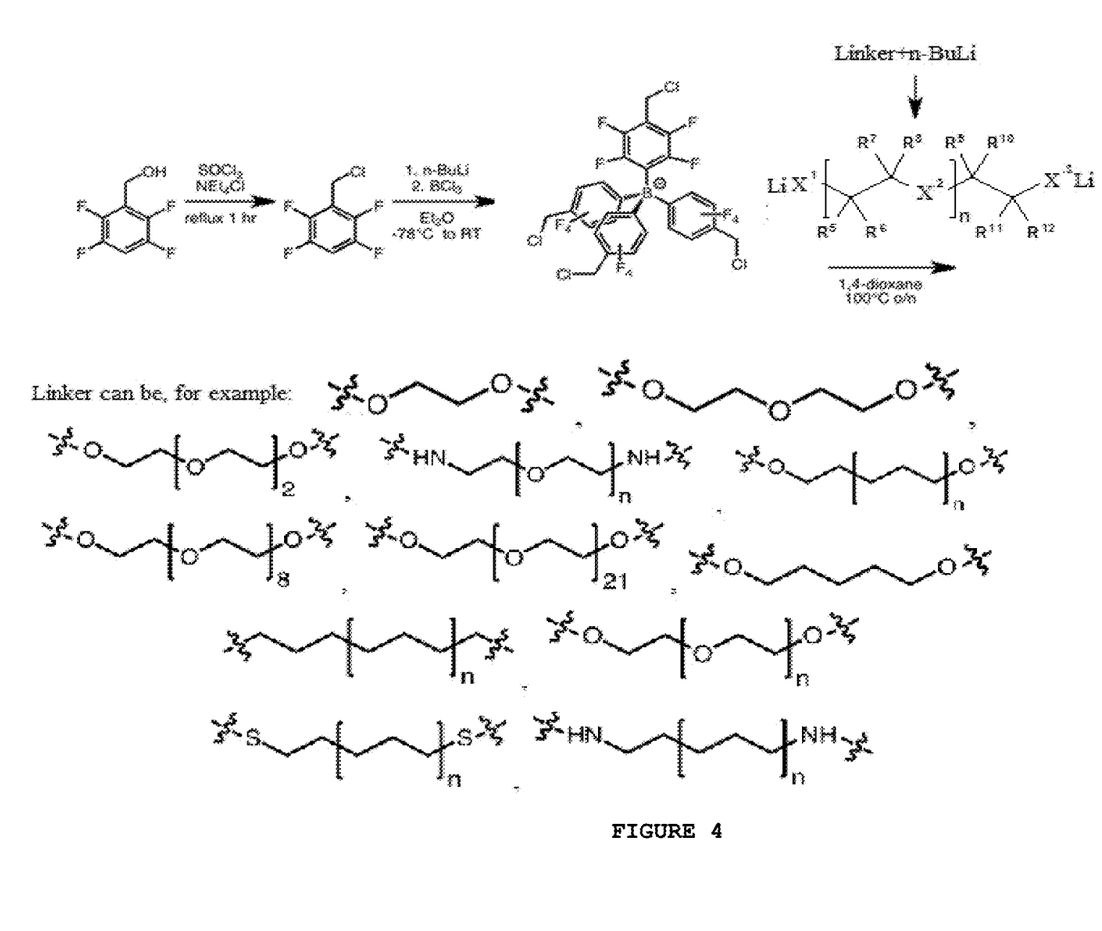
FIG. 4 shows a general synthesis scheme.

, and (see, also, e.g., FIG. 4). The PEG150A sample was generated using only 2 equivalents of base, whereas the full 4 equivalents were applied to the PEG150B sample. This difference results in a higher degree of cross-linking in the PEG150B sample than in the PEG150A sample. All 4 equivalents of base were applied to the PEG400 and PEG1000 samples.

Figure 5A:
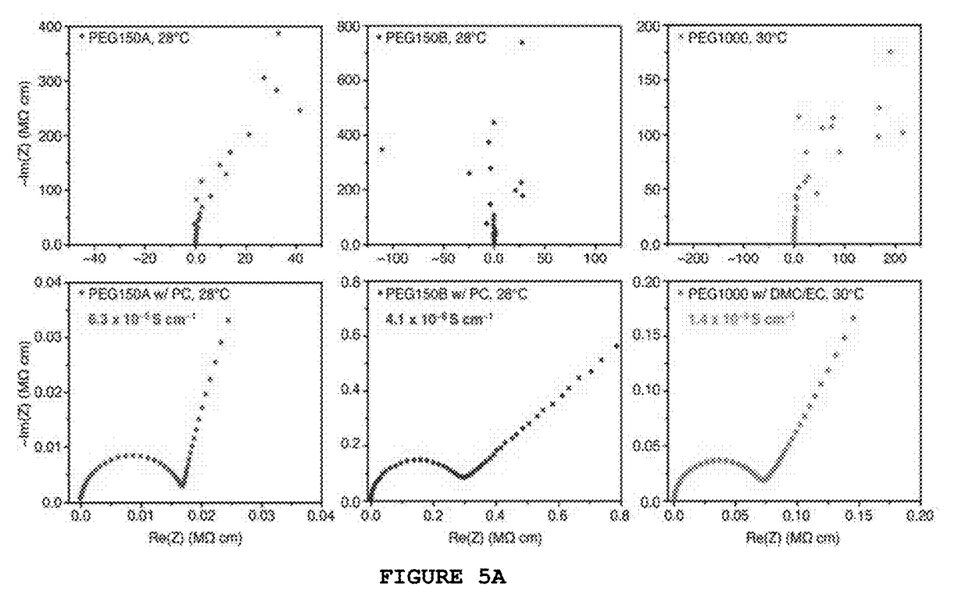
FIG. 5A-B shows (A) Nyquist impedance plots for PEG150 and PEG1000 polymers at ambient temperature. Top row: Measurements taken on dry samples. Bottom row: A single process was observed for each sample after the addition of propylene carbonate (PC) or a mixture of dimethyl carbonate/ethylene carbonate (DMC/EC). (B) shows conductivity of different linkers loaded with 68 wt % PC.
Figure 5B:
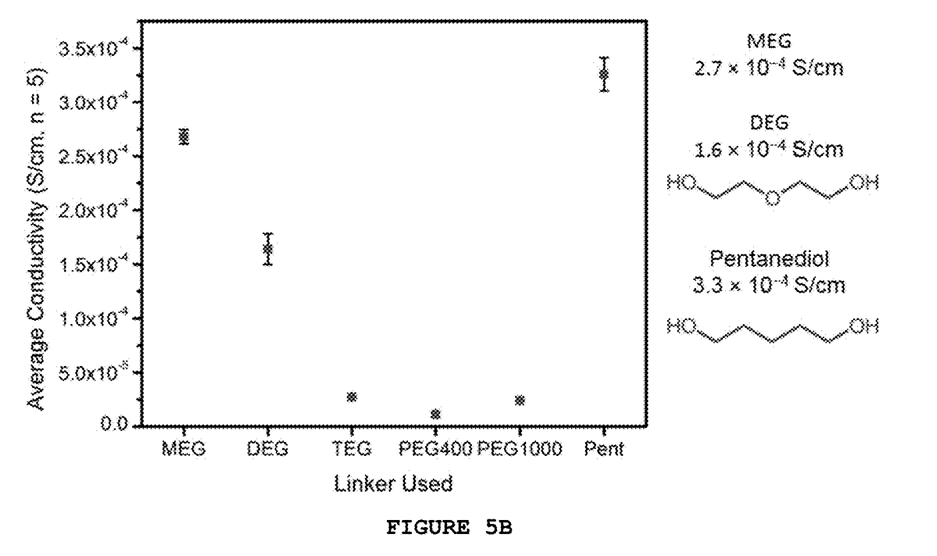

Regardless of linker length, AC impedance measurements showed that all materials were essentially non-conductive at room temperature in their dry state. However, conductivity as high as $2.7 \times 10^{-4}$ S/cm was observed for the materials with PEG linkers after the addition of plasticizer (see, FIGS. 5A and B). Changing the composition of the linker from PEG to an alkanediol further increased conductivity to as high as $3.3 \times 10^{-4}$ S/cm.

Figure 6:
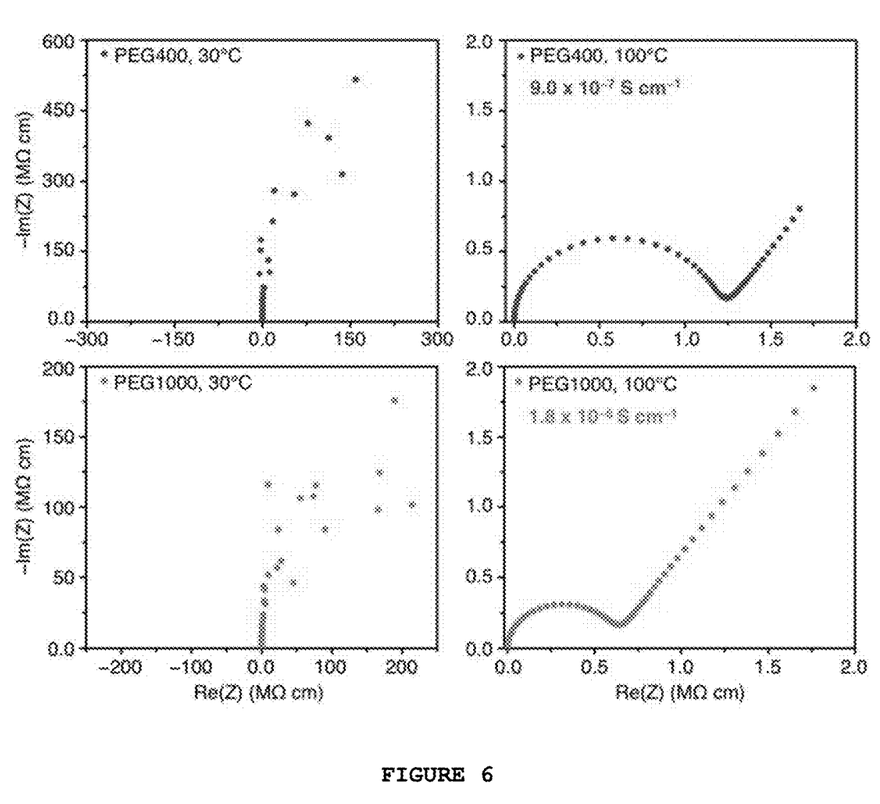
FIG. 6 shows Nyquist plots of AC impedance data at elevated temperatures for PEG400 and PEG1000 polymers.
Figure 7:
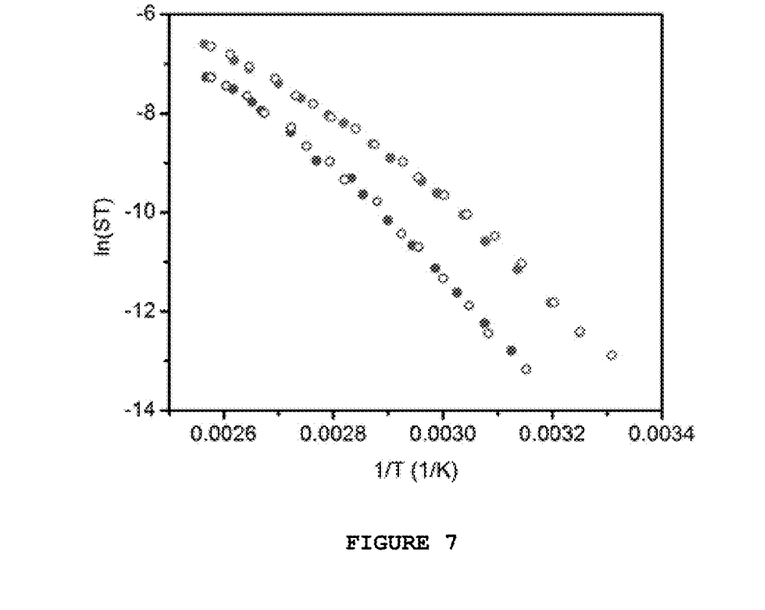
FIG. 7 shows Nernst-Einstein plot of variable temperature data for the PEG400 and PEG1000 polymers.

Variable temperature experiments were performed on PEG150, PEG400, and PEG1000 samples from 25° C. to 110° C. Within this range, both PEG150 samples were non-conductive in their dry state. After the addition of solvent, the PEG150A and PEG150B samples were found to exhibit activation energies of 0.31 and 0.53 eV, respectively. (see, e.g., FIG. 6).

Materials containing the longer PEG400 and PEG1000 linkers were conductive at elevated temperatures. Unlike the ln(ST) vs. 1/T plots for the PEG150 samples, those for the PEG400 and PEG1000 materials were not entirely linear. The slope generated by the PEG400 dataset gave an activation energy of 0.89 eV. The PEG1000 dataset gave two clear temperature regimes; the temperature region below 60° C. produced a linear fit giving an activation energy of 0.84 eV while the region above 60° C. gave an activation energy of 0.58 eV.

The transference number ($t_+$) gives the ratio of Li-ions moving through the electrolyte to the total number of ions moving through the electrolyte. A single-ion conductor should theoretically exhibit $t_+=1$, through values $t_+ \geq 0.9$ are common. The transference measurement was performed in a Li—Li cell at 60° C. using PEG1000 material that was 57% dimethyl carbonate/ethylene carbonate (DMC/EC) by weight (See, e.g., FIG. 8). The value obtained for $t_+$ was $0.88 \pm 0.05$, which supports the claim that these materials are single-ion conductors.

Figure 8:
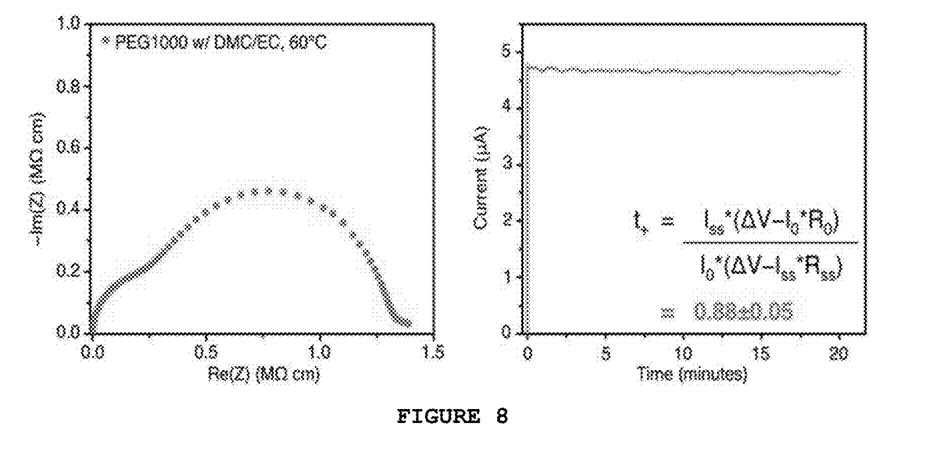
FIG. 8 shows Transference number experimental data. Left: Nyquist plot of the PEG1000 material in a Li—Li cell. Right: Current through the Li—Li cell over time while applying a potential of 300 mV vs. Li metal.

Due to the Li metal electrodes, AC impedance measurements reveal two processes occurring in the cell; the higher frequency process is due to the movement of Li ions through the electrolyte, while the lower frequency process results from Li ions crossing the electrode-electrolyte interface.

A number of embodiments have been described herein. Nevertheless, it will be understood that various modifications may be made without departing from the spirit and scope of this disclosure. Accordingly, other embodiments are within the scope of the following claims.

What is claimed is:

1. A conductive three dimensional (3D) polymer network comprising a plurality of cores having a structure of Formula I:

(Formula I)

wherein, $R^1$-$R^{12}$ are independently selected from the group comprising H, D, optionally substituted alkyl, optionally substituted heteroalkyl, optionally substituted alkenyl, optionally substituted heteroalkenyl, optionally substituted alkynyl, optionally substituted heteroalkynyl, optionally substituted cycloalkyl, optionally substituted cycloalkenyl, optionally substituted aryl, optionally substituted heterocycle, optionally substituted mixed ring system, wherein one or more adjacent R groups are optionally linked together to form one or more substituted rings selected from the group comprising cycloalkyl, cycloalkenyl, heterocycle, aryl, and mixed ring system; and n is 0 or more; $X^1$-$X^3$ are each independently O, $CH_2$, NH or S.

2. A conductive three dimensional (3D) polymer network comprising a plurality of cores having a structure of Formula I(a):

Formula I(a)

wherein, $R^5$-$R^{12}$ are independently selected from the group comprising H, D, optionally substituted alkyl, optionally substituted heteroalkyl, optionally substituted alkenyl, optionally substituted heteroalkenyl, optionally substituted alkynyl, optionally substituted heteroalkynyl, optionally substituted cycloalkyl, optionally substituted cycloalkenyl, optionally substituted aryl, optionally substituted heterocycle, optionally substituted mixed ring system, wherein one or more adjacent R groups are optionally linked together to form one or more optionally substituted rings selected from the group comprising cycloalkyl, cycloalkenyl, heterocycle, aryl, and mixed ring system; wherein n is 0 or more; $X^1$-$X^3$ are each independently O, $CH_2$, NH or S.

3. A conductive three dimensional (3D) polymer network comprising a plurality of cores having a structure of Formula I(b):

Formula I(b)

wherein, $R^5$-$R^{12}$ are independently selected from the group comprising H, D, optionally substituted alkyl, optionally substituted heteroalkyl, optionally substituted alkenyl, optionally substituted heteroalkenyl, optionally substituted alkynyl, optionally substituted heteroalkynyl, optionally substituted cycloalkyl, optionally substituted cycloalkenyl, optionally substituted aryl, optionally substituted heterocycle, optionally substituted mixed ring system, wherein one or more adjacent R groups are optionally linked together to form one or more optionally substituted rings selected from the group comprising cycloalkyl, cycloalkenyl, heterocycle, aryl, and mixed ring system; wherein n is 0 or more.

4. The conductive 3D polymer network of claim 1 or 2, wherein X1-X3 are selected from the group consisting of:
(a) $X^1$-$X^3$ are each O;
(b) $X^1$ and $X^3$ are each O, S or NH and $X^2$ is selected from O, S, NH or $CH_2$;
(c) $X^1$ and $X^3$ are 0 and $X^2$ is $CH_2$;
(d) $X^1$ and $X^3$ are S and $X^2$ is $CH_2$; and
(e) $X^1$ and $X^3$ are NH and $X^2$ is $CH_2$ or O.

5. The conductive 3D polymer network of claim 1, 2 or 3, wherein $R^5$-$R^{12}$ are independently selected from H, D, F, hydroxyl, amino, and alkoxy.

6. The conductive 3D polymer network of claim 5, wherein $R^5$-$R^{12}$ are H.

7. The conductive 3D polymer network of claim 6, wherein the polymer network has a diamondoid connectivity, or an amorphous topology.

8. The conductive 3D polymer network of claim 6, wherein the polymer network has dense interpenetration of a plurality of individual polymer networks.

9. The conductive 3D polymer network of claim 6, wherein the polymer network is non-porous.

10. The conductive 3D polymer network of claim 6, wherein the polymer network was processed by immersing the polymer network in one or more of the following solvent mixtures: deionized water, methanol, 1:1 methanol:tetrahydrofuran, tetrahydrofuran, and dichloromethane.

11. The conductive 3D polymer network of claim 6, wherein the polymer network was dried by heating to at least 100 to about 120° C. under high vacuum (<0.1 torr) for at least 12 hours.

12. The conductive 3D polymer network of claim 6, wherein the 3D polymer network is loaded with a plasticizer.

13. The conductive 3D polymer network of claim 6, wherein the 3D polymer network conducts lithium ions.

14. The conductive 3D polymer network of claim 13, wherein the 3D polymer network has lithium ion conductivity of at least $3.3 \times 10^{-4}$ S/cm at 100° C.

15. The conductive 3D polymer network of claim 6, wherein the 3D polymer network cannot be penetrated by lithium dendrites.

16. The conductive 3D polymer network of claim 6, wherein n is 8 to 21 the linker is flexible.

17. The conductive 3D polymer network of claim 6, wherein n is 0, 1, 2, 3, 4, 5, 6, 7, 8, 9, 10, 11, 12, 13, 14, 15, 16, 17, 18, 19, 20 or 21.

18. The conductive 3D polymer network of claim 6, wherein the 3D polymer network comprises a plurality of lithium ions.

19. A battery comprising the conductive 3D polymer network of claim 6.

20. The battery of claim 19, wherein the battery is a lithium ion battery.

* * * * *